United States Patent [19]

Rehl

[11] Patent Number: 5,754,836
[45] Date of Patent: May 19, 1998

[54] SPLIT BUS ARCHITECTURE FOR MULTIPOINT CONTROL UNIT

[75] Inventor: F. Christian Rehl, Medway, Mass.

[73] Assignee: VideoServer, Inc., Burlington, Mass.

[21] Appl. No.: 531,462

[22] Filed: Sep. 21, 1995

[51] Int. Cl.[6] .................................................. H04M 7/15
[52] U.S. Cl. ............... 395/553; 395/200.78; 395/200.79; 395/881
[58] Field of Search ............................ 395/200.02, 200.2, 395/550, 200.78, 200.79, 801, 500, 553

[56] References Cited

U.S. PATENT DOCUMENTS

| | | | |
|---|---|---|---|
| 4,719,621 | 1/1988 | May | 370/85 |
| 4,896,256 | 1/1990 | Roberts | 364/200 |
| 5,369,617 | 11/1994 | Munson | 365/219 |
| 5,434,996 | 7/1995 | Bell | 395/550 |

FOREIGN PATENT DOCUMENTS

| | | | |
|---|---|---|---|
| 2-131647 | 8/1990 | Japan | 364/200 |
| 2261800 | 5/1993 | United Kingdom . | |
| 83/03936 | 11/1983 | WIPO . | |
| 84/01071 | 3/1984 | WIPO . | |

OTHER PUBLICATIONS

*Computer Telephony*, 16 unnumbered pages (Jun., 1995).
"Multi–Vendor Integration Protocol—H–MVIP, Working Document," GO–MVIP, The Global Organization for Multi-Vendor Integration Protocol, pp. 1–13, (Apr. 1995).
"Multi–Vendor Integration Protocol Reference Manual, Release 1.0," Natural MicroSystems Corporation, 12 pages, 1991.
"Video MCU Gets the Standard Treatment," *Data Communications International* 22, pp. 50 and 52, (1993, Jan.).
Takeshi, G., "Home Bus System and Its Terminal Equipment," Patent Abstracts of Japan, European Patent Office, Application No. JP880286123, one page, (May 21, 1990).

Primary Examiner—Larry D. Donaghue
Attorney, Agent, or Firm—Hamilton, Brook, Smith & Reynolds, P.C.

[57] ABSTRACT

A split bus arrangement for increasing network interface bandwidth capacity in a multipoint control unit includes a bus clock circuit for passing clock signals from a first network bus to a second network bus over a common interprocessor bus. A preferred timing arrangement provides frequency and phase lock among processor units communicating on the common interprocessor bus.

9 Claims, 6 Drawing Sheets

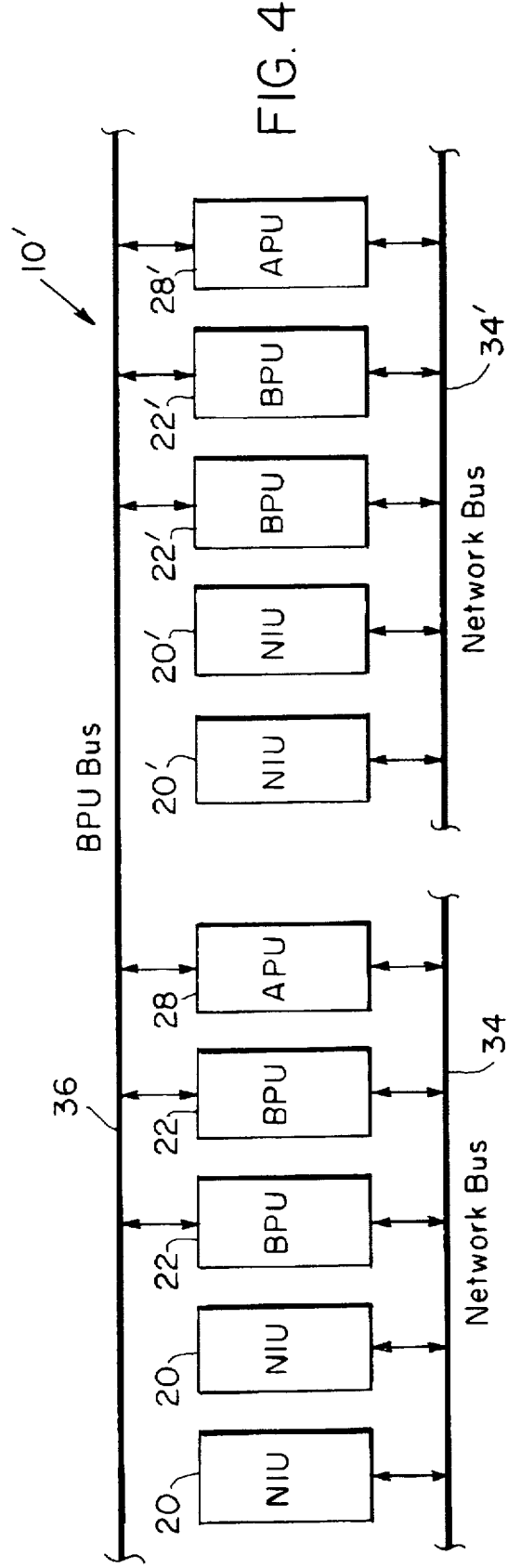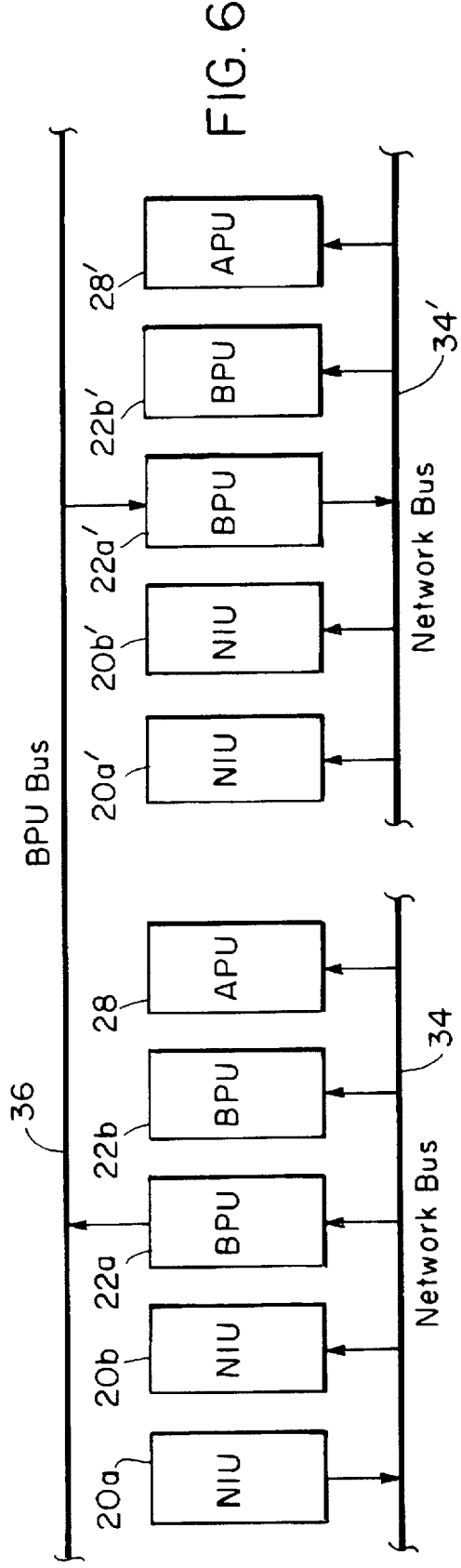

SPLIT BUS ARCHITECTURE FOR MULTIPOINT CONTROL UNIT

BACKGROUND OF THE INVENTION

Video teleconferencing systems allow for simultaneous exchange of audio, video and data information among multiple audiovisual terminals. Systems known as multipoint control units (MCUs) perform switching functions to allow three or more audiovisual terminals to intercommunicate in a conference. The central function of an MCU is to link multiple video teleconferencing sites together by receiving frames of digital signals from audiovisual terminals, processing the received signals, and retransmitting the processed signals to appropriate audiovisual terminals as frames of digital signals. The digital signals can include audio, video, data and control information.

One PC-based MCU, disclosed in co-pending application Ser. No. 08/379,274, includes application-driven communication buses based on the Multi-Vendor Integration Protocol® (MVIP). (*Multi-Vendor Integration Protocol Reference Manual Release* 1.0, Natural MicroSystems Corporation, 1991.) MVIP supports the integration of technology from diverse vendors and the integration of telephony functions and computing capacity by providing standard elements or protocols. These include a digital telephony bus, a telephone switching capability and the software conventions needed for an integrated system. An MVIP bus according to the MVIP-90 standard consists of 16 serial lines providing 8 separate bi-directional data streams. Each data stream operates at 2.048 Mbps and is capable of carrying 32 channels of 64 Kbps each. Thus, a single MVIP bus according to the MVIP-90 standard has the capacity for 256 full duplex telephone channels. The MVIP communication bus is typically implemented as a single ribbon cable which passes signals from circuit board to circuit board in a PC chassis.

An MCU having an MVIP-compatible network bus is limited to supporting up to 8 T1 or 8 E1 network interfaces due to the bus capacity of 8–2.048 Mbps, bi-directional data streams. It would be advantageous to be able to increase the network interface capacity to serve more users more efficiently.

SUMMARY OF THE INVENTION

The above-noted capacity constraint could be alleviated in a proprietary bus system by, for example, increasing the bus capacity by adding more wires or by increasing the bus clock rate. However, since many telecommunications systems today are built to be compatible with open standards, it would be disadvantageous to require non-standard circuit boards. One advantage of the present invention is the ability to expand system bandwidth capacity without requiring redesign of circuit boards built to be compatible with open standards. Instead, the present invention requires only modification of system-specific circuit boards, a key advantage in a multi-vendor environment.

Accordingly, the present invention expands the capacity of an MVIP-type bus system by adding a second network bus. The approach provides two separate network buses in a system, each having a group of network interface units and a processor comprising processing units. To allow for communications between the two groups as well as between processing units within each group, the processors are connected to a common interprocessor bus.

One aspect of the invention is the bus timing arrangement. In an existing system having a single network bus, one of the network interface units generates bus clock signals derived from a synchronous network interface for use by other units operating on the network bus. Since the existing interprocessor bus does not carry any timing signals, the timing for interprocessor communications on the interprocessor bus is derived from the bus clock signals on the network bus.

In a system having two network buses, each bus could have a network interface unit generate separate bus clock signals for its respective network bus. If the clock-generating network interface units are connected to the same network or different, but synchronous networks which are timed by a Stratum 1 clock, the two network buses will be frequency locked.

A timing problem arises because even though the two buses can be frequency locked, the two buses will not necessarily be phase locked. The present invention avoids the problem whereby the interprocessor bus can experience bit errors due to the difference in clock phases between the two network buses.

Accordingly, in a preferred embodiment, a first processor coupled to a first network bus receives clock signals generated by a first network interface unit and drives the clock signals onto an interprocessor bus. A second processor coupled to the interprocessor bus and to a second network bus receives the clock signals on the interprocessor bus and drives the second network bus with the clock signals. Second network interface units coupled to the second network bus receive the clock signals from the second network bus.

In another preferred embodiment, a first processor coupled to a first network bus receives clock signals generated by a first network interface unit and drives the clock signals onto an interprocessor bus. Other processing units coupled to the interprocessor bus receive the clock signals for timing on the interprocessor bus. A second network interface unit coupled to a second network bus generates clock signals for use by other units on the second network bus.

BRIEF DESCRIPTION OF THE DRAWINGS

The above and other features of the invention including various novel details of construction and combinations of parts will now be more particularly described with reference to the accompanying drawings and pointed out in the claims. It will be understood that the particular apparatus embodying the invention is shown by way of illustration only and not as a limitation of the invention. The principles and features of this invention may be employed in varied and numerous embodiments without departing from the scope of the invention.

FIG. 4 is a block diagram of an MCU having two network buses.

FIG. 6 is a block diagram of a first preferred timing arrangement of the present invention.

DETAILED DESCRIPTION OF PREFERRED EMBODIMENTS

Figure 1:
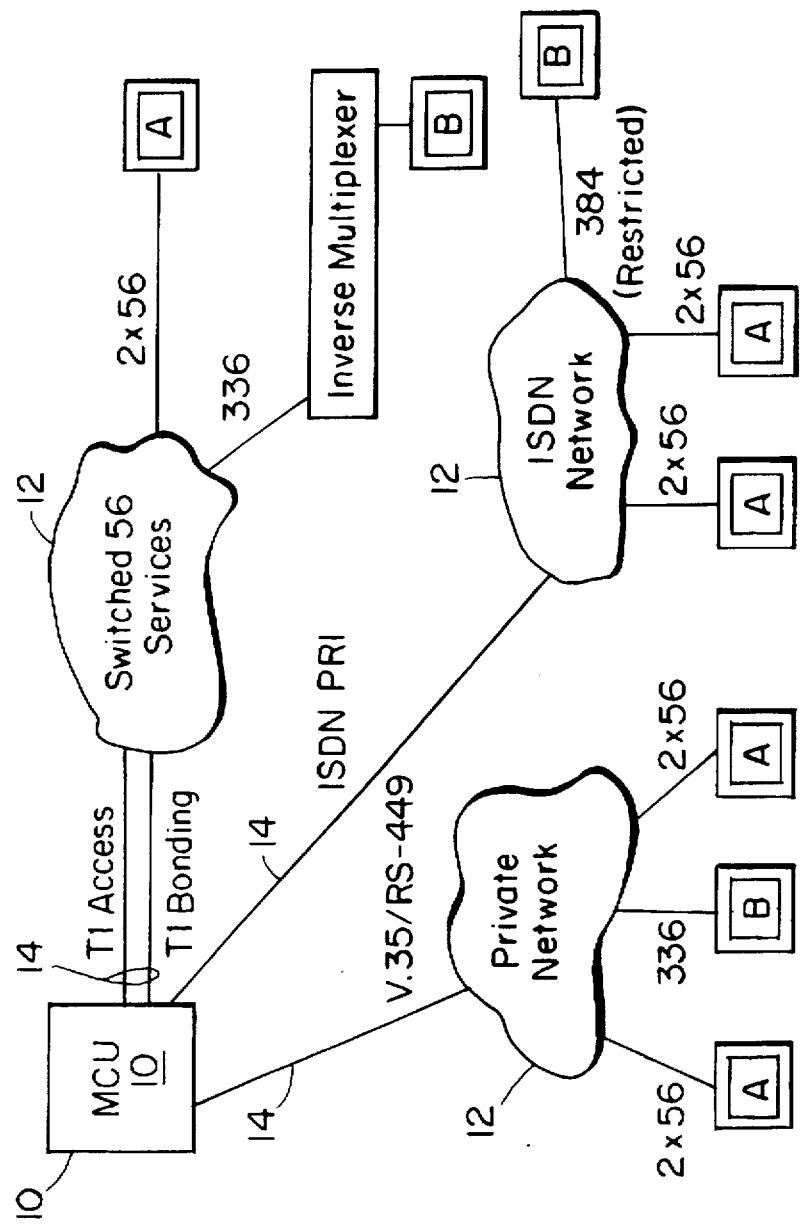
FIG. 1 diagrammatically illustrates a video teleconferencing system having multiple audiovisual terminals connected to an MCU through a variety of networks.

Referring to FIG. 1, a video teleconferencing system is shown in which audiovisual terminals A, B are connected to an MCU 10 through a variety of communications networks 12, each network having a particular type of access interface 14 to the MCU 10, e.g., V.35/RS-449 for private networks, PRI for ISDN networks, and T1 access for switched 56 networks. One conference consists of audiovisual terminals A operating at one data rate connected through their respective communications networks to the MCU 10 while another conference comprises audiovisual terminals B operating at another data rate similarly configured.

Figure 2:
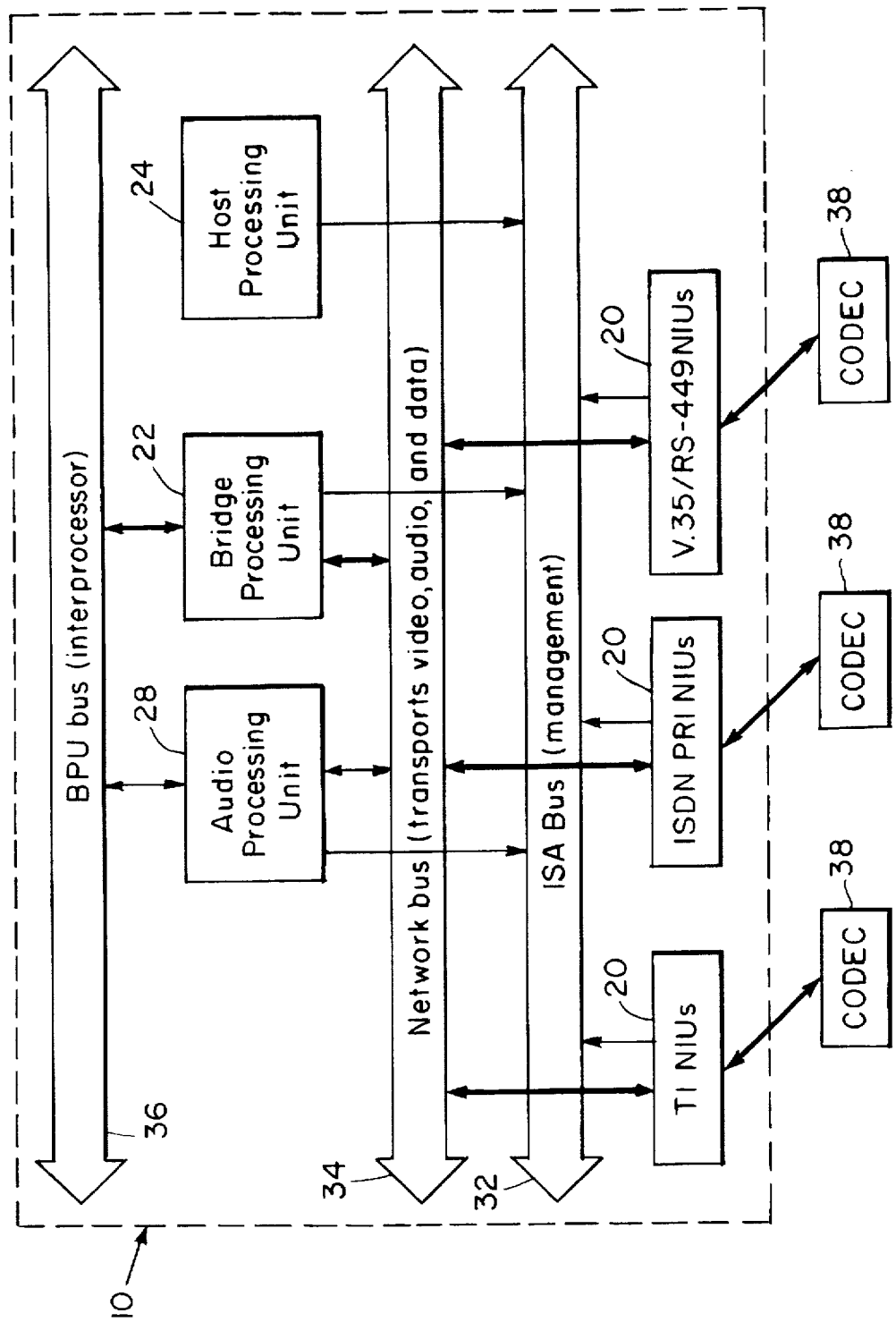
FIG. 2 is a block diagram of an MCU configuration.

FIG. 2 illustrates MCU 10 installed in a host 80386 or 80486-based PC, further disclosed in U.S. patent application Ser. No. 08/379,274 which is incorporated herein in its entirety by reference. There are three major components in MCU 10: at least one Network Interface Unit (NIU) 20, at least one Bridge Processing Unit (BPU) 22, and a Host Processing Unit (HPU) 24. In addition, there can be optional Audio Processing Units (APUs) 28. Each of these components is a digital device for processing digital data. In addition to a host Industry Standard Architecture (ISA) bus 32, the MCU 10 includes a Network Bus 34 and a BPU Bus 36. The Network Bus 34 complies with the Multi-Vendor Integration Protocol (MVIP) while the BPU Bus 36 is a derivative of the MVIP specification. External audiovisual terminals, or codecs 38, connect to the MCU 10 to form conferences.

The MCU operation will now be described at a high-level with respect to FIG. 2. Each codec 38, typically an H.320 audiovisual terminal, connects to the MCU 10 through a communications network. Unsynchronized digital data frames from each codec 38 are made available on the Network bus 34 through NIUs 20. The BPUs 22 process the unsynchronized data frames from the Network Bus 34 to produce data frames aligned on an octet boundary which are made available to other BPUs 22 on the BPU bus 36. The BPUs 22 also extract audio information from the data frames. The audio information is decoded to PCM data and made available on the BPU bus 36 for mixing with audio from other codecs 38 by respective BPUs 22 in a conference. The BPUs 22 combine compressed video information and mixed encoded audio information into frames which are placed on the Network Bus 34 for transmission to respective codecs 38.

In a standard conference, the BPUs 22 perform video switching within a conference by selecting video data frames from timeslots on the BPU bus 36 and routing the frames to respective codecs 38 in the conference. A particular BPU 22 selects the appropriate video data frames based upon an MCU conference selection process. Typically, the selection process is based upon a comparison of the voice levels of the conference locations. The loudest conference location is designated the current broadcaster to be viewed by all other conference locations while the current broadcaster typically views another location. In alternative conference selection processes, an MCU operator or a particular audiovisual terminal operating in a chair control mode selects a location as the current broadcaster.

Having provided an overview of the MCU operation, each of the buses and the major system components will be described further. The MVIP-compliant Network Bus 34 comprises eight full-duplex, serial time-division multiplexed 125 μs data streams which adhere to the Mitel ST-BUS (Serial Telecom) Generic Device Specification. Each data stream operates at 2 Mbps and is divided into 32 separate timeslots. The total capacity of the bus is therefore 256 timeslots with each timeslot having a capacity of 64 Kbps. In addition to being time-division multiplexed within a data stream, the digital data is space-division multiplexed across the data streams. In this way, a frame of digital data from a communications network can be multiplexed across any of the 256 timeslots for intra-MCU communications.

The MVIP-derivative BPU bus 36, also referred to as an interprocessor bus, is a TDM serial bus capable of handling sixteen streams. In one embodiment, each stream operates at 2 Mbps, and has 32 timeslots, each timeslot at 64 Kbps for a total of 32 Mbps transfer rate. In another embodiment operating at 4 Mbps, there are 64 timeslots in each stream, for a total of 64 Mbps.

The HPU 24 provides a management interface to a workstation (not shown) for MCU operations. Through the HPU 24, an operator can control and manage the operation of the other components. The HPU 24 controls the setup and establishment of conferences, and performs monitoring and maintenance functions.

Each NIU 20 connects the MCU 10 with a particular communications network to a particular codec 38 through an appropriate interface port. The NIU 20 formats the digital data frames that pass between the MCU 10 and codecs 38 for transmission within the MCU 10 and across the various communications networks. Because the MCU 10 supports many codec connections simultaneously, tariffs usually favor use of multiplexed high-speed interfaces. The most common type of NIU 20 supports a single T1 or ISDN primary rate interface over which the network service (e.g., a communications carrier) has time-division-multiplexed a number of individual codec connections. The MCU 10 can also include NIUs having interface ports that support only single codec connections.

The frame structure for the data exchanged between the MCU 10 and the codecs 38 is defined in TSS Rec. H.221. Each NIU 20 reformats the digital data frames from the incoming line to an internal MCU format that is independent of the individual codec interfaces to the communications network. The reformatted data is then multiplexed onto the Network Bus channels for transmission to the BPUs 22.

The MCU 10 shown in FIG. 2 implements video switching as time and space division multiplexing, instead of analog signal selection switching. The BPUs 22 handle video switching within conferences by selecting and routing time and space-division multiplexed digital data. Each BPU 22 can support four codecs (audiovisual terminals) and multiple BPUs may be connected through the BPU bus 36. For each codec connection, the BPU 22 demultiplexes the digital data frames from the Network Bus 34, mixes the digital audio data, and multiplexes new digital data frames onto the Network Bus 34 from the mixed digital audio and the appropriate digital video and conferencing data.

Figure 3:
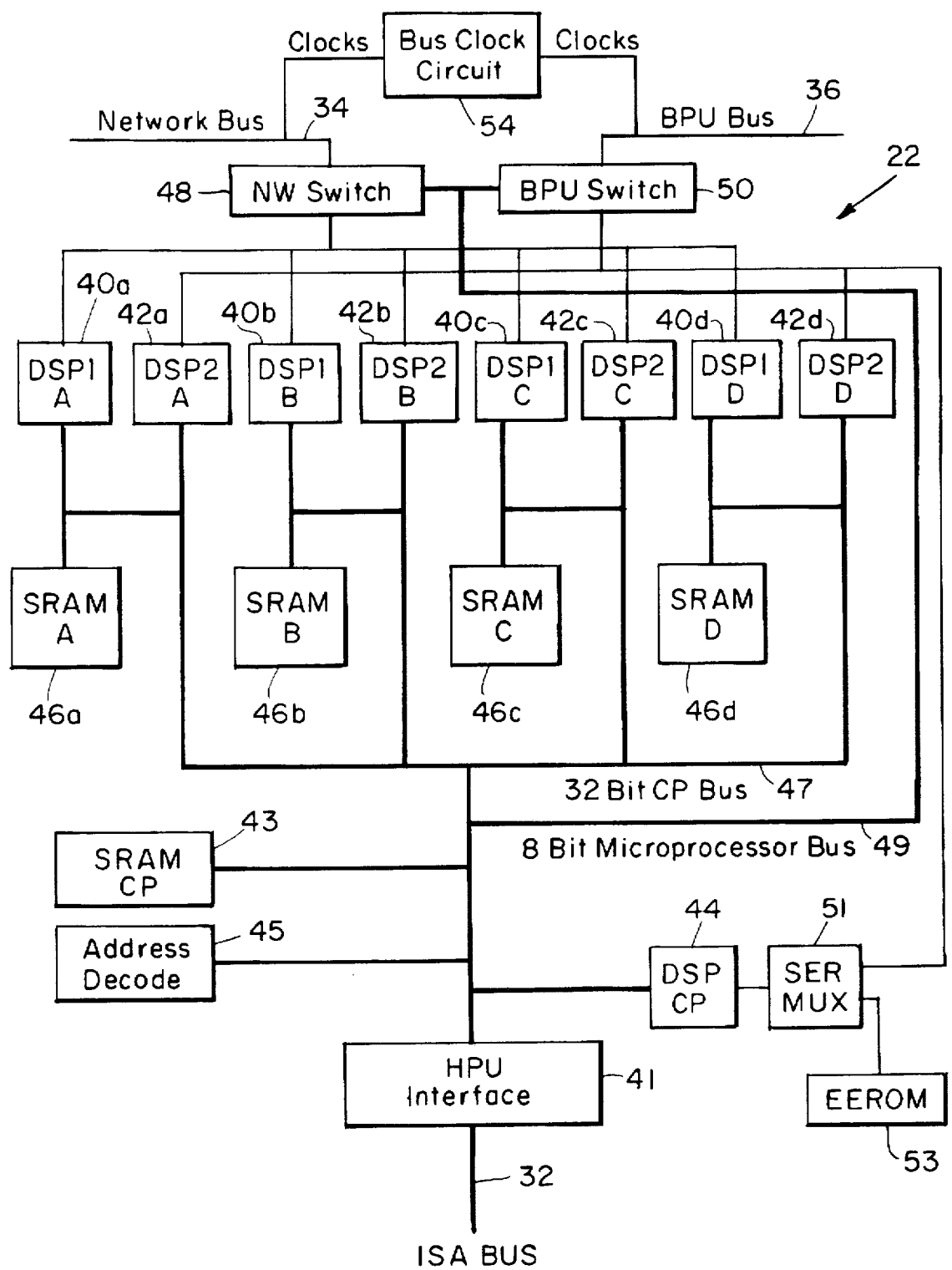
FIG. 3 is a block diagram of a Bridge Processing Unit of the MCU configuration of FIG. 2.

A detailed block diagram of BPU 22 is illustrated in FIG. 3. The BPU 22 is segmented into four partitions (A, B,C,D), each partition having a pair of Digital Signal processors (DSP) 40, 42 assignable to a particular codec. Each BPU partition (A,B,C,D) contains a first DSP (DSP1) 40 and a second DSP (DSP2) 42. In general, DSP1 40 transfers and analyzes data to and from the Network Bus 34 and manages a buffer for this data in SRAM memory 46 shared between DSP1 40 and DSP2 42. In general, DSP2 42 processes data that has been pre-processed by DSP1 40 and maintains inter-BPU communications over the BPU Bus 36. The DSP1 40 and DSP2 42 perform their processing functions asynchronously with respect to the timing on the BPU bus 36 and the Network bus 34. A bus clock circuit 54 is operable to receive and drive clock signals from and to the BPU bus and the network bus in accordance with the present invention and is described herein.

Each BPU 22 also has a DSP that functions as a Control Processor (CP) 44 which maintains a list of partition associations. Because the data streams on the Network Bus 34 and BPU Bus 36 are time and space division multiplexed, the CP 44 operates a Time Division Multiplexer (TDM) having a network switch 48 and a BPU switch 50 to direct selected digital data frames from the data channels to the correct BPU partition. The TDM may be implemented by a Mitel MT8980D Digital Switch. The CP 44 supports a 32 bit CP bus 47 to the DSPs 40, 42 in the four partitions (A,B,C,D). In addition, the CP 44 supports an 8 bit bus 49 to the network switch 48 and the BPU switch 50. The CP 44 interfaces to TDM data streams through serial multiplexer 51. BPU configuration information may be stored in EEROM 53.

The BPU 22 has an HPU interface 41 which allows the HPU 24 (FIG. 2) to perform memory access of a CP SRAM memory 43 and I/O access to control the CP 44. Address decode block 45 supports HPU I/O access to the BPU 22 using programmable dip switches selected by system configuration.

Referring again to FIG. 2, the optional APU 28 provides processing support to the BPUs 22 when the MCU 10 is connected to a video conferencing system that uses the TSS G.728 audio compression algorithm. The TSS G.728 audio protocol compresses audio data to 16 Kbps instead of the more typical 48 or 56 Kbps. The audio compression thus provides more bits for use in representing a higher quality video image. The APU 28 connects to the ISA bus 32, the Network Bus 34 and the BPU bus 36.

In a preferred embodiment of the present invention, as shown in FIG. 4, the network interface capacity is effectively doubled by adding a second network bus 34'. A first group of NIUs 20, BPUs 22, and APU 28 connect to the first network bus 34. A second group of NIUs 20', BPUs 22', and APU 28' connect to the second network bus 34'. The BPUs 22, 22' and the APUs 28, 28' share digital audio and video data over a common BPU bus 36. The arrows indicate bi-directional data communications with the buses. The ISA bus 32 (not shown) is also common to all units. The MCU conference operation for MCU 10' is the same as that described earlier for MCU 10.

The bus timing will now be described. In an MVIP-based system, one of the circuit boards provides the master clock for all the interfaces connected to an MVIP bus. The MVIP-90 standard defines three clock signals: /C4, C2, and /F0. The signals /C4 and C2 are the Mitel ST-Bus 4.096 MHz and 2.048 MHz clocks. The /F0 signal is the Mitel ST-bus 8 KHz framing signal.

In MCU 10, an NIU 20 (FIG. 2) is selected to provide the system clock signals. The selected NIU 20 generates the clock signals from timing embedded in digital data signals received from a codec 38 over a communications network. For example, the NIU 20 recovers timing from a T1 network interface by a known phase locked loop (PLL) circuit driven by the ones pulses in the T1 bipolar signal. The MVIP clock signals are then derived from the PLL circuit output. The selected NIU 20 drives the derived clock signals onto the network bus 34 which are then received by other NIUs 20 and by BPUs 22 and APUs 28 for timing communications on the network bus 34.

In an MCU 10 having only a single network bus 34, heretofore the timing for the BPU bus 36 has been taken from the clock signals on the network bus 34 by each BPU 22. By adding a second network bus 34' to form MCU 10', as illustrated in FIG. 4, a timing problem arises when a group of BPUs 22 on the first network bus 34 attempt to communicate with a group of BPUs 22' on the second network bus 34' via the BPU bus 36. The first and second network buses 34, 34' will be frequency locked since the selected NIUs 20, 20' on the network buses 34, 34' derive timing from the same network or from separate synchronous networks timed by a Stratum 1 clock. However, the two network buses 34, 34' will not be phased locked. Thus, the BPU bus 36 could experience bit errors due to the difference in the clock phase between different network bus groups. The present invention avoids this timing problem with a timing arrangement which provides phase and frequency lock between different network bus groups operating on the common BPU bus 36.

Figure 5:
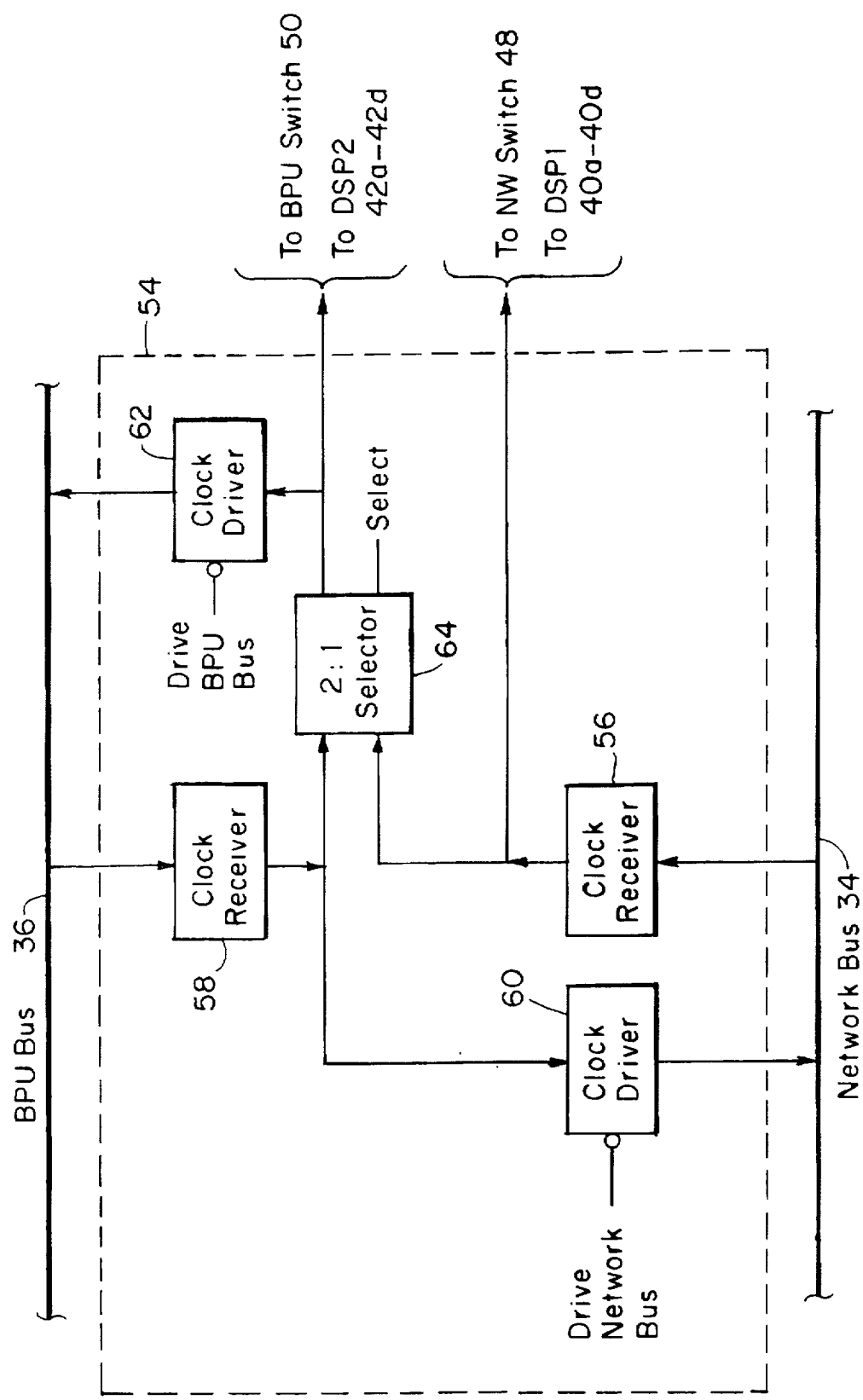
FIG. 5 is a block diagram of the clock bus circuitry of FIG. 3.

The bus clock circuit 54 of BPU 22 (FIG. 3) is shown in more detail in the circuit block diagram of FIG. 5. The bus clock circuit 54 includes clock drivers and receivers to enable frequency and phase locked timing between different network bus groups operating on the common BPU bus 36. After describing the bus clock circuit 54, preferred timing arrangements between different network bus groups will be described.

The bus clock circuit 54 includes a pair of clock receivers 56, 58 which connect to the network bus 34 and BPU bus 36 respectively. Clock receiver 56 receives clock signals from the network bus 34 and passes these clock signals to network switch 48 and the four DSP1s 40a–40d (FIG. 3) for timing communications on the network bus 34. The clock signals include the MVIP standard clock signals, noted above: /C4, C2, and /F0. For simplicity, single line paths are used in FIG. 5 to represent the three clock signals. Clock receiver 58 receives clock signals from the BPU bus 36. A 2:1 selector 64 selects between the outputs of clock receivers 56, 58 to pass timing to BPU switch 50 and the four DSP2s 42a–42d (FIG. 3) for timing communications on the BPU bus 36.

The bus clock circuit 54 further includes a pair of clock drivers 60, 62 which connect to the network bus 34 and BPU bus 36 respectively. The clock drivers 60, 62 serve to selectively pass clock signals between the network bus 34 and the BPU bus 36. Clock driver 60 drives clock signals received by clock receiver 58 onto network bus 34. Clock driver 60 drives onto BPU bus 36 clock signals received by clock receiver 56 and passed through selector 64. Depending on the timing arrangement described further herein, the clock drivers 60, 62 are selectively enabled under software control. APU 28 (FIG. 2) includes a similar bus clock circuit 54.

Figure 7:
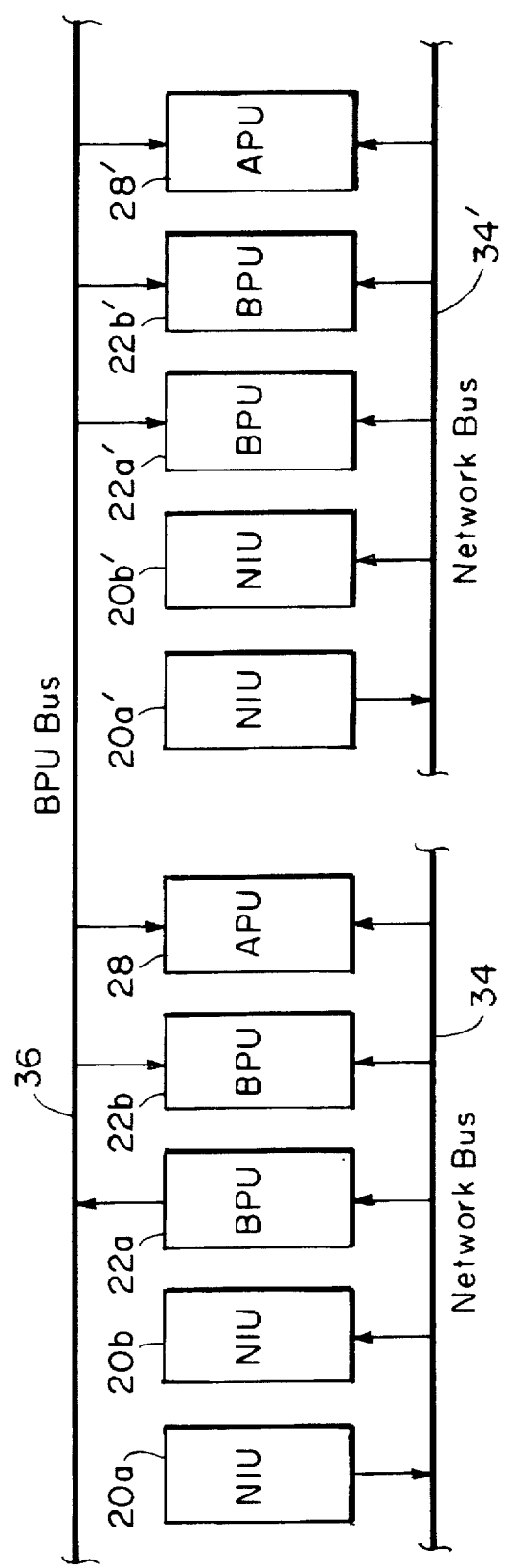
FIG. 7 is a block diagram of a second preferred timing arrangement of the present invention.

Preferred timing arrangements are shown in the block diagrams of FIGS. 6 and 7. In the diagrams, data connections are not shown for simplicity. An arrow pointing towards a bus indicates clock signals are being driven to the bus while an arrow pointing away from a bus indicates clock signals are being received from the bus.

Referring now to FIG. 6, a first network bus group includes NIUs 20a, 20b; BPUs 22a, 22b; and APU 28 connected to network bus 34. A second network bus group includes NIUs 20a', 20b'; BPUs 22a', 22b'; APU 28' connected to network bus 34'. Under software control, NIU 20a is selected to source clock signals to network bus 34 derived from a network interface (not shown) as described above. The other units (NIU 20b, BPU 22a, 22b, and APU 28) in the first network bus group receive the clock signals generated by NIU 20a on network bus 34. BPU 22a is selected to drive clock signals received from network bus 34 onto BPU bus 36. Referring to FIG. 5, the DRIVE BPU BUS line of clock driver 62 would be enabled to allow BPU 22a to drive the BPU bus 36. The BPU 22b and APU 28 (FIG. 6) take timing for communication on BPU bus 36 from the network bus 34 through selector 64.

Referring again to FIG. 6, the second network bus group connected to network bus 34' takes timing for communication on the network bus 34' and on the BPU bus 36 from the clock signals provided by BPU 22a of the first network bus group. Under software control, BPU 22a' is selected to receive clock signals from BPU bus 36 and drive these clock signals onto network bus 34'. Referring to FIG. 5, the DRIVE NETWORK BUS line of clock driver 60 would be enabled to allow BPU 22a' to drive the network bus 34'. The other units (NIU 20a', 20b'; BPU 22b', and APU 28') in the second network bus group receive the clock signals driven by BPU 22a' onto network bus 34'. In addition, BPU 22b' and APU 28' take timing for communication on BPU bus 36 from the network bus 34' through selector 64.

Referring to FIG. 7, another preferred timing arrangement is shown. NIU 20a again sources clock signals to network bus 34 derived from the network. The other units (NIU 20b, BPU 22a, 22b and APU 28) in the first network bus group again receive the clock signals generated by NIU 20a on network bus 34. BPU 22a again drives clock signals from the network bus 34 onto BPU bus 36. The difference is that BPU 22b and APU 28 instead receive timing for BPU bus communication from the clock signals placed on the BPU bus 36 by BPU 22a. Referring again to FIG. 5, the selector 64 for BPU 22b is set to select the input from clock receiver 58.

Referring again to FIG. 7, another difference is that NIU 20a' is selected to source clock signals derived from its network connection for placement on network bus 34'. The other units in the second network bus group (NIU 20b', BPU 22a', 22b', APU 28') receive clock signals generated by NIU 20a' for communication on network bus 34'.

Another difference from the first timing arrangement is that BPUs 22a', 22b' and APU 28' take timing for BPU bus communication directly from the clock signals placed on the BPU bus 36 by BPU 22a of the first network bus group. This second timing arrangement has less delay than the first timing arrangement. The software would only need to select one BPU in the system to drive the BPU bus clocks. In the first timing arrangement, software control would require selecting one BPU in the first network bus group to drive the BPU bus clocks and one BPU in the second group to drive the network bus clocks onto network bus 34'.

Equivalents

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A multipoint control unit for conferencing audiovisual terminals operable to send and receive digital data signals, comprising:

a first bus;

a plurality of first network units, each coupled to a respective audiovisual terminal and to the first bus, for multiplexing digital data signals onto the first bus;

one of the first network units deriving clock signals from digital signals received from a respective audiovisual terminal, and driving the clock signals onto the first bus; each of the other first network units receiving the clock signals from the first bus;

an interprocessor bus;

a first processor coupled to the first bus and to the interprocessor bus, the first processor including processing means for demultiplexing digital data signals from the first bus, processing digital data signals into timeslots on the interprocessor bus, selecting digital data signals from appropriate timeslots on the interprocessor bus, and multiplexing the digital data signals onto the first bus;

the first processor further including a bus clock circuit for receiving clock signals from the first bus and for driving clock signals to the interprocessor bus for clocking interprocessor communications;

a second bus;

a plurality of second network units, each coupled to a respective audiovisual terminal and to the second bus, for multiplexing digital data signals onto the second bus; and a second processor coupled to the second bus and to the interprocessor bus, the second processor including processing means for demultiplexing digital data signals from the second bus, processing digital data signals into timeslots on the interprocessor bus, selecting digital data signals from appropriate timeslots on the interprocessor bus, and multiplexing the selected digital data signals onto the second bus;

the second processor further including a receiver for receiving clock signals from the interprocessor bus for clocking interprocessor communications.

2. The multipoint control unit of claim 1 wherein the second processor drives clock signals to the second bus; and wherein each of the second network units receive clock signals from the second bus.

3. The multipoint control unit of claim 2 wherein the second processor comprises a plurality of second processing units which receive clock signals from the second bus.

4. The multipoint control unit of claim 1 wherein the first processor comprises a plurality of first processing units which receive clock signals from the first bus.

5. The multipoint control unit of claim 1 wherein one of the second network units derives clock signals from digital signals received from a respective audiovisual terminal, and drives the clock signals onto the second bus; and wherein the second network units receives the clock signals from the second bus, and wherein the first and second processors each comprise a plurality of processing units which receive clock signals from the interprocessor bus for clocking interprocessor communications.

6. The multipoint control unit of claim 1 wherein the bus clock circuit comprises:

a selector;

a network bus clock receiver having input coupled to the first bus and output coupled to one input of the selector;

an interprocessor bus clock receiver having input coupled to the interprocessor bus and output coupled to another input of the selector;

a network bus clock driver having input coupled to output of the interprocessor bus clock receiver and output coupled to the first bus; and an interprocessor bus clock driver having input coupled to output of the selector and output coupled to the interprocessor bus;

wherein the network bus clock driver and the interprocessor bus clock driver are controlled by a central processor.

7. Apparatus comprising:

an interprocessor bus for interconnecting plural processing units;

plural network buses, each network bus connected to an external network through a network interface unit and having clock frequency synchronization with the respective external network, each network bus connecting a separate group of the plural processing units;

wherein at least one network bus derives its clock through its respective network interface unit and the interprocessor bus derives its clock from one of the plural network buses.

8. The apparatus of claim 7 wherein one network bus derives its clock through its respective network interface unit and each of the other network buses derives its clock from the interprocessor bus.

9. The apparatus of claim 7 wherein each network bus derives its clock through its respective network interface unit.

* * * * *